United States Patent
Costa et al.

(10) Patent No.: US 11,453,274 B2
(45) Date of Patent: Sep. 27, 2022

(54) SUN TRACKING SYSTEM FOR PROVIDING SUN PROTECTION ACTIONS AND VEHICLE SERVICES

(71) Applicant: Ford Global Technologies, LLC, Dearborn, MI (US)

(72) Inventors: Alexandre Costa, Salvador (BR); Philippe Lopes, Salvador (BR); Diego Gouveia, Salvador (BR); Newton Filho, Lauro de Freitas (BR); Pedro Correa, Lauro de Freitas (BR); Islan Peterson Ferreira, Salvador (BR)

(73) Assignee: Ford Global Technologies, LLC, Dearborn, MI (US)

(*) Notice: Subject to any disclaimer, the term of this patent is extended or adjusted under 35 U.S.C. 154(b) by 451 days.

(21) Appl. No.: 16/588,745

(22) Filed: Sep. 30, 2019

(65) Prior Publication Data

US 2021/0094394 A1    Apr. 1, 2021

(51) Int. Cl.
*G06F 17/00* (2019.01)
*B60J 3/04* (2006.01)
(Continued)

(52) U.S. Cl.
CPC .............. *B60J 3/04* (2013.01); *B60H 1/0075* (2013.01); *B60Q 9/00* (2013.01); *E06B 9/24* (2013.01);
(Continued)

(58) Field of Classification Search
CPC ...... B60J 3/04; B60H 1/0075; B60H 1/00771; B60Q 9/00; E06B 9/24; E06B 2009/2417;
(Continued)

(56) References Cited

U.S. PATENT DOCUMENTS 5,553,661 A * 9/1996 Beyerlein .......... B60H 1/00735
165/203
8,044,784 B2   10/2011 Ghannam et al.
(Continued)

FOREIGN PATENT DOCUMENTS

DE    102010054081 A1    6/2012
DE    102019205598 A1 * 10/2020
(Continued)

OTHER PUBLICATIONS

BBC News, "Ford reveals solar-powered car with sun-tracking technology", https://www.bbc.com/news/technology-25575306, Jan. 2, 2014, 13 pages.

*Primary Examiner* — Ronnie M Mancho
(74) *Attorney, Agent, or Firm* — Frank Lollo; Eversheds Sutherland (US) LLP (57) ABSTRACT

A computer-implemented method includes receiving, with a vehicle computing system, global position system (GPS) data associated with a vehicle, determining a solar position relative to the vehicle, receiving trip information associated with the vehicle, and executing one or more vehicle actuators based at least in part on the GPS data, the trip information and the solar position relative to the vehicle. Determining the solar position can include determining a sun glare period during a future time period based at least in part on the trip information associated with the vehicle. The vehicle computing system may display a warning indicative of the sun glare period, generate a window tint command that causes the window to tint and/or generate a vent control command that causes the vent to change one or more of an airflow temperature, and an airflow velocity.

19 Claims, 6 Drawing Sheets

(51) Int. Cl.
*G07C 5/08* (2006.01)
*B60Q 9/00* (2006.01)
*B60H 1/00* (2006.01)
*G01S 3/786* (2006.01)
*E06B 9/24* (2006.01)

(52) U.S. Cl.
CPC ............ *G01S 3/7862* (2013.01); *G07C 5/085* (2013.01); *E06B 2009/2417* (2013.01)

(58) Field of Classification Search
CPC ....... G01S 3/7862; G01S 19/42; G07C 5/085; G07C 5/0825; B60K 2370/178; B60K 2370/37; B60K 35/00; G01C 21/025; G01C 21/3407; H04W 4/40
USPC .......................................................... 701/36
See application file for complete search history.

(56) References Cited

U.S. PATENT DOCUMENTS

| | | | |
|---|---|---|---|
| 8,212,874 B2* | 7/2012 | Zeng | B60R 11/04 |
| | | | 348/148 |
| 9,778,831 B2 | 10/2017 | Penilla et al. | |
| 9,855,827 B1* | 1/2018 | Zambito | G02F 1/0126 |
| 10,471,966 B2* | 11/2019 | Dudar | B60W 50/0225 |
| 10,768,012 B2* | 9/2020 | Akselrod | G01C 21/3691 |
| 10,915,673 B2* | 2/2021 | Novak | G06F 30/20 |
| 2005/0086002 A1* | 4/2005 | Keppler | B60R 16/0315 |
| | | | 701/469 |
| 2009/0027759 A1* | 1/2009 | Albahri | B60J 3/04 |
| | | | 359/601 |
| 2011/0202221 A1* | 8/2011 | Sobue | B60K 16/00 |
| | | | 701/22 |
| 2019/0001793 A1 | 1/2019 | Zeidan | |
| 2019/0322154 A1* | 10/2019 | Ganguly | B60H 1/00742 |
| 2021/0008958 A1* | 1/2021 | Porta | B60Q 9/00 |

FOREIGN PATENT DOCUMENTS

| | | |
|---|---|---|
| KR | 20130027640 A | 3/2013 |
| KR | 20160143366 A | 12/2016 |

* cited by examiner

SUN TRACKING SYSTEM FOR PROVIDING SUN PROTECTION ACTIONS AND VEHICLE SERVICES

TECHNICAL FIELD

The present disclosure relates to sun protection systems in a vehicle, and more particularly, to providing sun protection actions based on predicted future solar incidence during a predicted vehicular trajectory.

BACKGROUND

The shining of direct sunlight into the passenger compartment of a vehicle through any of its window glazing can in some instances give rise to glare and heat. In prior attempts to reduce direct sunlight, tinted glass has been used in the window glazing.

A method for determining a solar position and orientation with respect to a vehicle is disclosed in German Patent Pub. No. DE102010054081 (hereafter "the '081 Publication") which describes a system that determines a parking position for a vehicle based on heat inputs associated with solar altitude and the orientation of the vehicle. The system described in the '081 Publication provides a visual suggestion for parking orientation on a vehicle display based on time, date, and GPS information, which are used to predict solar altitude. While the system may predict future solar positions with respect to a parked vehicle, the '081 Publication does not disclose analyzing a future vehicle trip to determine sun glare periods during the trip, displaying warnings to the driver regarding sun glare, or providing individualized vehicle services during the trip that are customized to the position of the vehicle with respect to the sun.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Aspects of the present disclosure are directed to methods and systems for calculating sun position and incidence with respect to a vehicle. More particularly, aspects of the present disclosure may predict future positions of the vehicle based on trip plan information, and use mathematical and computational models for celestial positioning to determine if and when the vehicle may encounter hazards such as sun glare (where a driver may have impaired vision due to incident sunlight). In other aspects, the systems and methods may provide climate control and other measures that activate and control particular vehicle vents, airflow volumes, airflow temperatures, and other aspects of cabin climate controls.

The vehicle computing system associated with a vehicle may receive global position system (GPS) data associated with the vehicle. The computing system may determine a solar position relative to the vehicle, receive trip information associated with the vehicle, and execute one or more vehicle actuators based at least on the trip information and the solar position relative to the vehicle.

In some aspects, determining the solar position can include determining an anticipated sun glare period during a future time period based at least in part on the trip information associated with the vehicle. The vehicle computing system may display a warning indicative of the sun glare period, generate a window tint command that causes the window to tint and/or generate a vent control command that causes the vent to change one or more of an airflow temperature, and an airflow velocity.

Illustrative Embodiments

The disclosure will be described more fully hereinafter with reference to the accompanying drawings, in which exemplary embodiments of the disclosure are shown, and which are not intended to be limiting.

Figure 1:
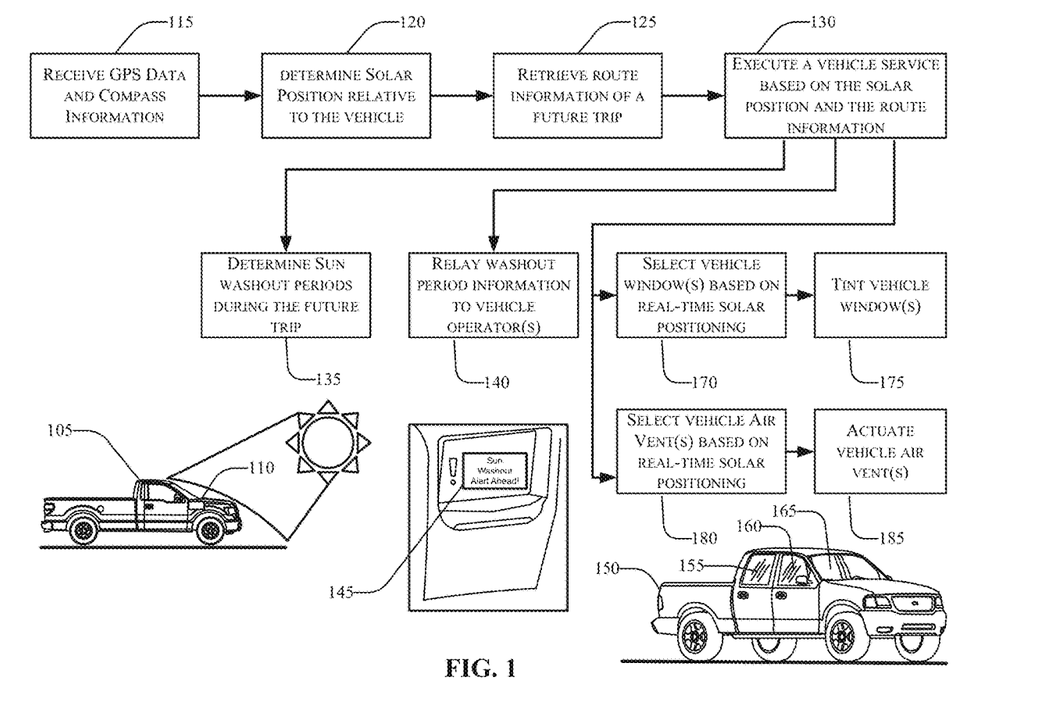
FIG. 1 depicts an example flow diagram depicting various methods for practicing embodiments described herein.

FIG. 1 depicts a flow diagram and depictions for example embodiments described herein. A vehicle 105 may include an embedded celestial tracking system 110, which may be part of and/or executed by an automotive computer onboard the vehicle 105. An example automotive computer 345 is depicted and discussed in greater detail with respect to FIG. 3.

As depicted in FIG. 1, at step 115, the celestial tracking system 110 may receive GPS data and compass information associated with the vehicle 105.

At step 120, the automotive computer 345 may determine solar position relative to the vehicle 105, and retrieve route information associated with a future trip (shown as step 125). The future trip may be, for example, a planned road trip indicated in a navigational system used with the vehicle 105, which may be integrated with the vehicle 105 as part of an infotainment system, and/or be part of a connected mobile device.

At step 130, the automotive computer 345 may execute a vehicle service based on the solar position and the route information. The vehicle services may include various aspects of cabin environmental controls such as heating, ventilation, air conditioning (HVAC) and other systems. In other aspects, the executing the vehicle service may include dispatching one or more control signals to vehicle actuators that control aspects of cabin temperature and light transmission through the vehicle windows.

For example, the automotive computer 345 may control electrically actuated window tinting, perform one or more air vent directional adjustments, airflow volume adjustments, and perform other controls by executing instructions to actuators that control air temperature in the HVAC system.

Executing the vehicle service can include, for example, determining identified sun glare periods that may take place during the scheduled trip (also discussed herein as a future trip). During the trip, the automotive computer 345 may determine the sun position, determine a vehicle trajectory that includes travel speed and direction relative to the sun, and determine time information associated with the progress of the vehicle 105 along the planned route. The vehicle computer 345 may use the anticipated sun position and vehicle trajectory to predict times and geographic locations along the scheduled route where the driver of the vehicle may face sun glare conditions that can limit their view of the road and other vehicles, and at step 140, relay the sun glare period information to an output device such as an infotainment display in the vehicle cabin. The sun glare period information may include information indicative of a time, location, or other information associated with incidence of sunlight that may prevent or reduce visibility for a driver and/or passengers of the vehicle 105.

Executing the vehicle service can include other control steps as well. For example, the vehicle services may include selecting particular vehicle windows based on real-time solar positioning, and/or a future solar positioning based on a projected vehicle location and/or orientation. Another vehicle 150 is depicted in FIG. 1, having individually controlled electronic window tinting mechanisms and controls (not shown in FIG. 1) for a rear passenger window 155, a front passenger window 160, and a windshield 165. Accordingly, the vehicle computer 345 may select window(s) 155, 160, and/or 165 based on the real-time solar positioning as depicted in step 170, and tint the vehicle windows (as shown in step 175) based at least in part on the route information and solar position information, and further based on the vehicle speed, direction, time, and other information that may change with time. For example, for portions of the trip where the sun incidence is on the passenger side of the vehicle 150, the automotive computer 345 may selectively control the window tinting mechanisms, which may include electrochromic glass, polymer matrix film crystal glass, SPD glass, or other electrically actuated window tinting technologies. Electronically tinted glass changes the tint (e.g., the chromatic transparency) of any window by electrically modifying particle alignment in a thin film within the glass itself or within a plastic film adhered to or between glass surface(s). As used herein, tinting a window refers to control of an amount of infrared, visible light, and ultraviolet (UV) radiation entering windows in an automobile.

The automotive computer 345 may control tint for the window(s) 155 and 160, which may provide comfort to passengers on the right side of the vehicle 150. In other aspects, the step 175 can include tinting the windshield 165 based on the real-time solar positioning determined at step 170 to avoid sun glare for the driver and front passenger.

The automotive computer 345 may be configured and/or programmed to select vehicle air vents based on the real-time solar position information as shown in step 180, and actuate the vehicle air vents as shown in step 185 such that the air flow is increased, decreased, made warmer, cooler, etc., based on the input information described above.

Figure 2:
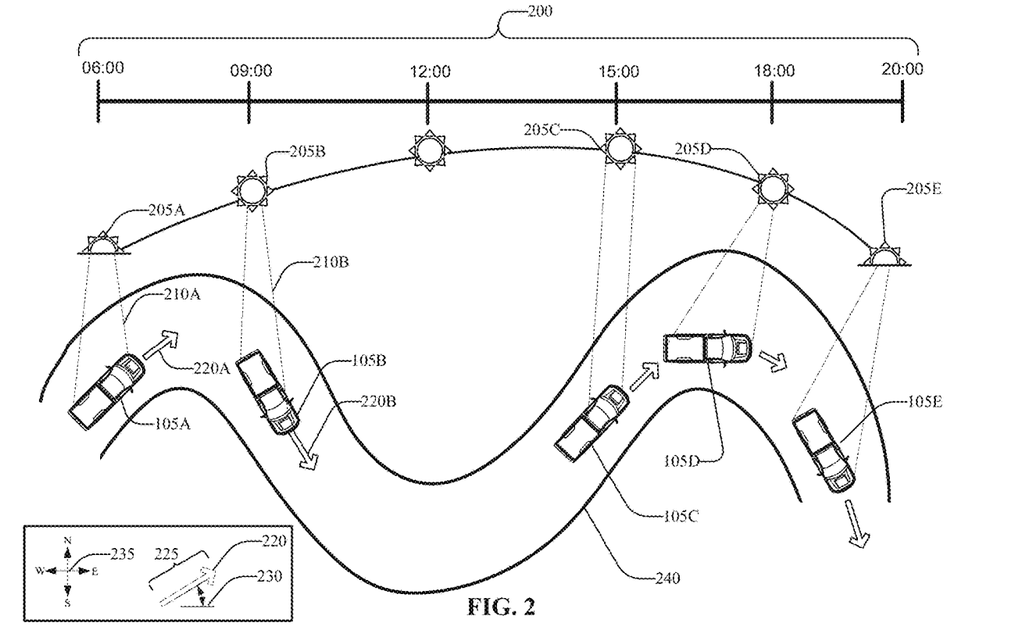
FIG. 2 depicts an example of solar positions and vehicle exposure during a trip according to embodiments described herein.

FIG. 2 depicts an example of vehicle 105 exposure to the solar positions 205A-E in view of various solar chronological positions 200 during a vehicle road trip, according to embodiments described herein. FIG. 2 depicts the vehicle 105 during various legs of the road trip, where each respective leg of the trip is shown with a successive letter A-E. It should be appreciated that the velocities and directions of travel represented by the travel velocity vector 220, the position(s) of the various solar chronological positions 200, and the relative incidence of the sunlight 210 from the various solar positions 205 are for description purposes only, and not intended to be limiting in any way.

During the road trip depicted in FIG. 2, the vehicle 105A may travel at varying velocities and travel directions, which change with respect to time. The velocity and direction of travel during the trip are depicted in FIG. 2 as a travel velocity vector 220, depicted as having a length representing a relative velocity 225 and a relative direction of travel 230 of the vehicle 105. The direction of travel 230 may be relative, for example, to a Cartesian coordinate system 235, or another directional scheme used in a navigational system (not shown in FIG. 2) of the vehicle 105.

For example, at 06:00 the vehicle 105 may begin the trip. The vehicle 105 is depicted as 105A at 06:00, where the solar position 205A exposes the vehicle 105A to sunlight 210A while the vehicle 105 is traveling on the road 240. The incidence of the sunlight 210, which changes slowly throughout the day, may affect different windows of the vehicle 105 as the vehicle changes direction. For example, the incidence of sunlight 210A at 06:00 may affect driving conditions on the driver side of the vehicle 105A given the shown direction of travel.

As the vehicle 105B travels throughout the day, along the planned route on the road 240, the angle of the incidence of incident sun light 210B changes with the position of the sun 205B and the relative angle of travel. As shown in FIG. 2, the velocity arrow 220B depicts a relative direction of the vehicle 105B, where the incidence of the incident sun light 210B primarily affects the rear window and the driver side windows of the vehicle 105B. In other aspects, a rear view mirror (not shown in FIG. 2) in the cabin interior of the vehicle 105B, and the driver side mirror on the exterior of the vehicle 105B may also be affected by the incidence of sun light at 09:00, due to the relatively low angle of the incident sun light 210B with respect to the horizon (not represented in FIG. 2).

At 15:00, the position of the sun 205C may affect the driver side of the vehicle 105C, and the windshield as it faces the incidence of the sun light 210C. At 18:00, the position of the sun 205D may affect the driver side of the vehicle 105D as it faces the incidence of the sun light 210D, and at 20:00, as the sun sets, the direction 220E of the vehicle may position the vehicle 105E such that only the driver side of the vehicle and the rear of the vehicle 105E are affected by the incidence of the sun light 210E.

Figure 3:
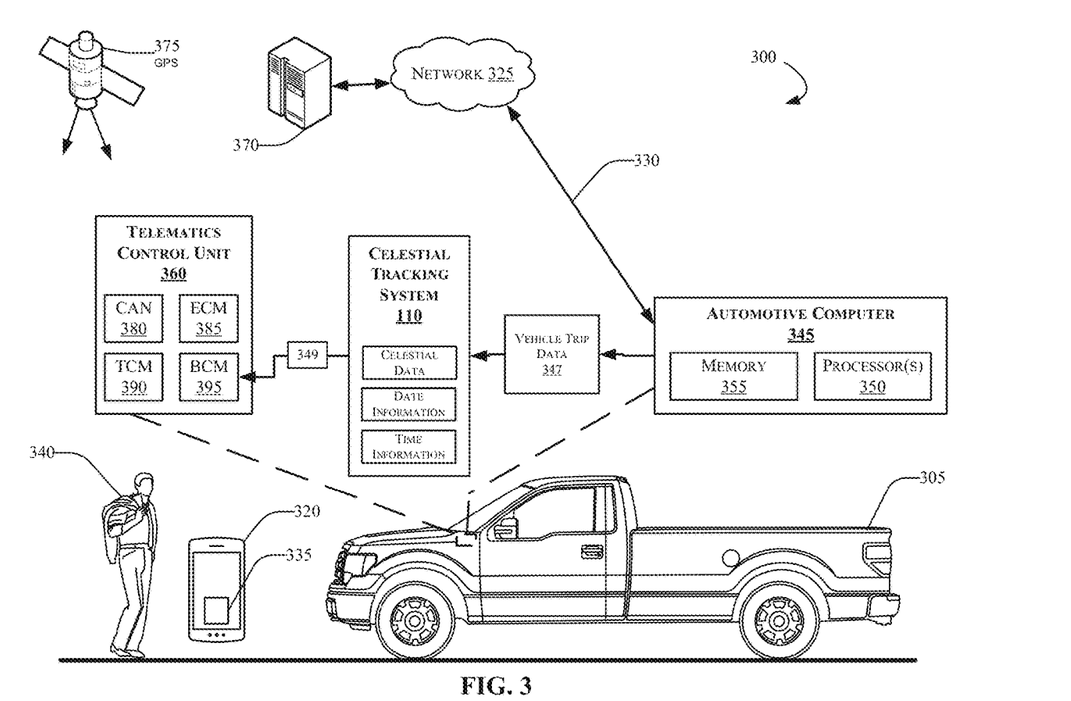
FIG. 3 depicts an example computing environment in which techniques and structures for providing the systems and methods disclosed herein may be implemented.

The celestial data associated with predicting positions of the solar position 205 may be known and modeled according to a sun tracking engine (one example of such an engine is discussed with respect to FIG. 3). One or more computing systems may use a sun tracking engine to predict the angles of incidence for the sun light 210 at future times and dates. For example, latitude and longitude information associated with a particular geographic location, in conjunction with known celestial data (e.g., where the sun is with respect to global geographical positions), date information, and time information, may be modeled such that the sun tracking engine may predict how sunlight may illuminate objects (e.g., the vehicle 105) at a later date. For example, the automotive computer 345, or another computing system, may predict a future position of the vehicle 105 according to trip information stored in a navigational program (not shown in FIG. 2). In other aspects, the relative direction of travel for the vehicle 105 may be predictable at a later date and time based on known trip information, which may be stored in a vehicle computing system, a mobile device operating a navigational program, and/or a remote server storing and/or operating a navigational system as a software service. Because the known trip information may include the intended route, the automotive computer 345 may predict the future position of the vehicle 105, with increased accuracy, based indications of current direction of travel, current velocities, past velocity over time, etc.

FIG. 3 depicts an example computing environment 300 that can include one or more vehicle(s) 305, an automotive computer 345, a telematics control unit (TCU) 360, and a mobile device 320 which may be operable by a user 340. The user 340 may be a driver of the vehicle 305, which may be substantially similar to and/or identical to the vehicles 105 depicted with respect to FIGS. 1 and 2. The mobile device 320 may be communicatively coupled with the vehicle 305 via one or more network(s) 325, which may communicate via one or more wireless channel(s) 330. The mobile device 320 may include one or more application(s) 335.

The vehicle 305 can include an automotive computer 345 having one or more processor(s) 350 and memory 355. The vehicle 305 may further include a Telematics Control Unit (TCU) 360, which may be disposed in communication with and/or be a part of the automotive computer 345. The TCU 360 may, in some example embodiments, be disposed in communication with the mobile device 320, and one or more server(s) 370, which may be associated with and/or include a Telematics Service Delivery Network (SDN) (not shown in FIG. 3). The vehicle 305 may also receive and/or be in communication with a Global Positioning System (GPS) 375.

Although illustrated as a truck, the vehicle 305 may be embodied as another passenger or commercial automobile such as, for example, a car, a sport utility vehicle, a crossover vehicle, a van, a minivan, a taxi, a bus, etc. Further, the vehicle 305 may be a manually driven vehicle, and/or be configured to operate in a fully autonomous (e.g., a driverless) mode or a semi-autonomous mode where the vehicle operator performs some driving functions and the vehicle performs other driving functions.

According to an example embodiment, a user 340 may control the one or more application(s) 335 (hereafter the application 335") operating on the mobile device 320 to enter trip information associated with a current or a future trip. The trip information may include the starting location, a destination, date information, time information, vehicle information, and other data associated with the trip. The application 335 may also include a user interface (e.g., the user interface 505 depicted with respect to FIG. 5 hereafter) configured and/or programmed to provide sun location information, control interfaces, and other aspects described herein.

In some aspects, the mobile device 320 may communicate with the vehicle 305 through the one or more channel(s) 330, which may be encrypted and established between the mobile device 320 and a Telematics Control Unit (TCU) 360. The mobile device 320 may communicate with the TCU 360 using a wireless transmitter associated with the TCU 360 on the vehicle 305. The transmitter may communicate with the mobile device 320 using a wireless communication network such as, for example, the one or more network(s) 325. The wireless channel(s) 330 are depicted in FIG. 1 as communicating via the one or more network(s) 325.

The one or more network(s) 325 illustrate an example of one possible communication infrastructure in which the connected devices may communicate. The one or more network(s) 325 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The TCU 360 can include communication and control access to a plurality of vehicle computing modules such as, for example, a Controller Area Network (CAN) bus 380, one or more Engine Control Modules (ECMs) 385, a Transmission Control Module (TCM) 390, and/or a Body Control Module (BCM) 395. Control and/or communication with other control modules not shown in FIG. 3 is possible, and such control is contemplated. In some aspects, the TCU 360 may control aspects of the vehicle 305 through the control modules 380-395 and implement one or more instruction sets received from the application 335 operating on the mobile device 320.

The automotive computer 345 may include one or more processor(s) 350 and a computer-readable memory 355. The automotive computer 345 may be installed in an engine compartment of the vehicle 305 (or elsewhere in the vehicle 305) as part of the celestial tracking system 110, in accordance with the disclosure. The automotive computer 345 may include, in one example, the one or more processor(s) 350, and a computer-readable memory 355. In other example embodiments, the TCU 360 may be integrated with and/or be incorporated with the automotive computer 345. For the sake of simplicity, the computing system architecture of the automotive computer 345 may omit certain computing modules. It should be readily understood that the computing environment depicted in FIG. 3 is one example of a possible implementation according to the present disclosure, and thus, it should not to be considered limiting or exclusive.

The one or more processor(s) 350 may be disposed in communication with one or more memory devices (e.g., the memory 355 and/or one or more external databases (not shown in FIG. 3). The memory 355 may be a non-transitory computer-readable memory, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. The memory 355 may be one example of a non-transitory computer-readable medium, and may be used to store programs in code and/or to store data for performing various operations in accordance with the disclosure.

The one or more processor(s) 350 may utilize the memory 355 to store programs in code and/or to store data for performing aspects of the present disclosure. The instructions in the memory 355 can include one or more separate programs, each of which can include an ordered listing of computer-executable instructions for implementing logical functions.

The memory 355 may store various code modules such as, for example, a secure communication controller (not shown in FIG. 3) for establishing the one or more channels (which may, in some embodiments, be encrypted channel(s)) between the mobile device 320, the TCU 360, and/or the automotive computer 345. The memory 355 may store the computer-executable instructions for performing various functions of the celestial tracking system 110, such as, for example, receiving vehicle trip data 347 (which may include, for example, GPS data associated with the vehicle 305). The memory 355 may also store instructions for executing one or more vehicle actuators based at least in part on the trip information and the solar position relative to the vehicle 305, as well as for performing vehicle control capabilities in accordance with the present disclosure. Although shown in FIG. 3 as a separate element from the automotive computer 345, it should be appreciated that the celestial tracking system 110 may be an integrated part of the automotive computer 345, and/or may be a computing module associated with the automotive computer 345, and/or may embody another computing architecture such as a program that is stored in the memory 355 and executed by the processor(s) 350. Consequently, the memory 355 may be used for storing code and/or data code and/or data for performing operations in accordance with the disclosure.

The celestial tracking system 110 may receive the vehicle trip data 347, reference celestial data, date information, and time information indicative of a present and/or future time, and generate one or more instruction(s) 349 to the TCU 360 for controlling one or more vehicle actuators.

In one example, the instruction(s) 349 may include instructions for relaying the sun glare period information associated with reduced and/or impaired visibility while driving the vehicle 305.

In another example, the instruction(s) 349 may provide executable instructions for generating a window tint command that causes a window to tint based at least in part on the selected vehicle window. In an embodiment, the BCM 395 may generate command control instructions that cause the windows to tint/change tint.

In another example, the instruction(s) 349 may provide executable instructions for generating a vent control command that causes the selecting an air vent actuator based at least in part on the solar position and the trip information. The air vent actuator may reduce airflow, increase airflow, change an airflow direction, volume, temperature, and/or perform another action that changes an environmental control inside the vehicle 305.

Figure 4:
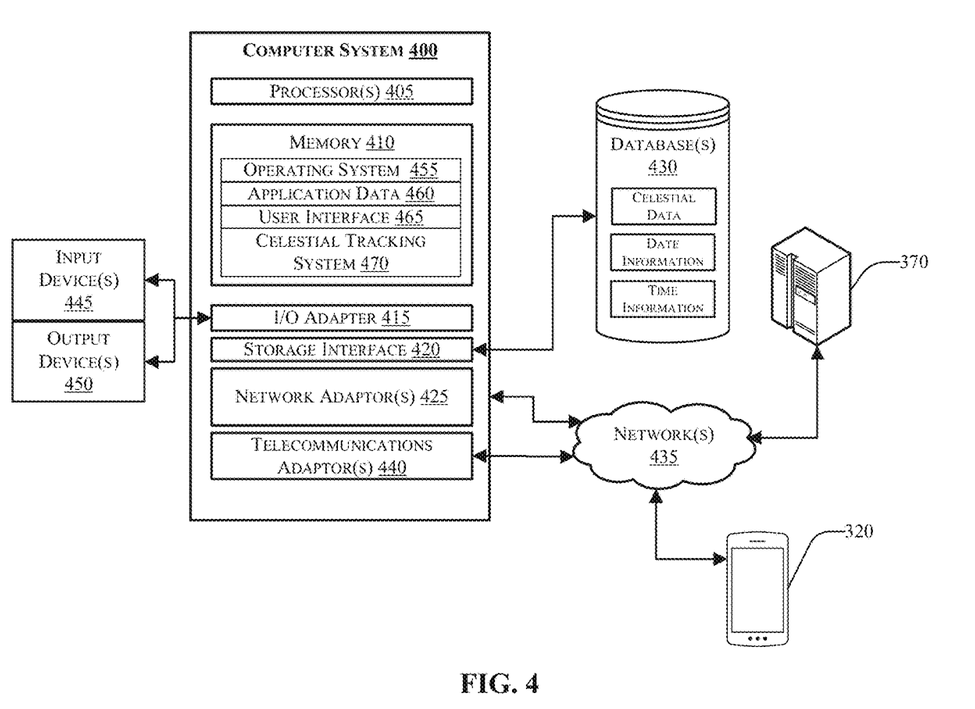
FIG. 4 illustrates a block diagram of an exemplary computing environment and computer system for use in practicing the embodiments described herein.

FIG. 4 illustrates a block diagram of an exemplary computing environment and computer system 400 for use in practicing the embodiments described herein. The environment and system described herein can be implemented in hardware, software (e.g., firmware), or a combination thereof.

As shown in FIG. 4, a computing system 400 may include one or more processor(s) 405, a memory 410 communicatively coupled to the one or more processor(s) 405, and one or more input/output adaptors 415 that can communicatively connect with external devices. The computing system 400 may operatively connect to and communicate information with one or more internal and/or external memory devices such as, for example, one or more databases 430 via a storage interface 420. The computing system 400 may include one or more network adaptor(s) 425 enabled to communicatively connect the computing system 400 with one or more networks 435. In one embodiment, the computer system 400 can include one or more Internet Protocol (IP)-based network(s) for communication between the computing system 400 and any external device. In such embodiments, the computing system 400 can further include one or more telecommunications adaptor(s) 440. The computing system 400 may further include and/or connect with one or more input devices 445 and/or one or more output devices 450 through the I/O adaptor(s) 415.

The one or more processor(s) 405 are collectively a hardware device for executing program instructions (aka software), stored in a computer-readable memory (e.g., the memory 410). The one or more processor(s) 405 can be a custom made or commercially-available processor, a central processing unit (CPU), a plurality of CPUs, an auxiliary processor among several other processors associated with the computer system 400, a semiconductor-based microprocessor (in the form of a microchip or chip set), or generally any device for executing instructions.

The one or more processor(s) 405 may be disposed in communication with one or more memory devices (e.g., the memory 410 and/or one or more external databases 430, etc.) via a storage interface 420. The storage interface 420 can also connect to one or more memory devices including, without limitation, one or more databases 430, and/or one or more other memory drives (not shown in FIG. 4) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc. The database(s) 430 may store information such as, for example, celestial data indicative of predicted positions of the sun and/or other celestial bodies, date information associated with current and/or future trips, vehicle information, vehicle fleet information, etc.

The memory 410 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The instructions in the memory 410 can include one or more separate programs, each of which can include an ordered listing of computer-executable instructions for implementing logical functions. In the example of FIG. 4, the instructions in the memory 410 can include an operating system 455. The operating system 455 can control the execution of other computer programs such as, for example, the celestial tracking system 470, and provides scheduling, input-output control, file and data management, memory management, and communication control and related services.

The program instructions stored in the memory 410 can further include application data 460, and instructions for controlling and/or interacting with the computer through a user interface 465.

The memory 410 can also include program instructions for a celestial tracking engine 470, which may be substantially similar to and/or identical to the celestial tracking system 110 described with respect to FIG. 1.

The I/O adaptor 415 can connect a plurality of input devices 445 to the computer system 400. The input devices can include, for example, a keyboard, a mouse, a microphone, a sensor, etc. The output device 450 can include, for example, a display, a speaker, a touchscreen, etc. The I/O adaptor 415 can further include a display adaptor coupled to one or more displays. The I/O adaptor 415 can be configured to operatively connect one or more input/output (I/O) devices 445, 450 to the computer system 400. For example, the I/O adaptor 415 can connect a keyboard and mouse, a touchscreen, a speaker, a haptic output device, or other output device. The output devices 450 can include but are not limited to a printer, a scanner, and/or the like. Other output devices can also be included, although not shown in FIG. 4. Finally, the I/O devices connectable to the I/O adaptor 415 can further include devices that communicate both inputs and outputs, for instance but are not limited to, a network interface card (NIC) or modulator/demodulator (for accessing other files, devices, systems, or a network), a radio frequency (RF) or other transceiver, a telephonic interface, a bridge, a router, and the like.

The computer system 400 can include one or more telecommunications adaptor(s) 440. The telecommunications adaptor(s) 440 can include a global positioning system (GPS), and/or one or more other adaptors configured to transmit and/or receive cellular, mobile, and/or other communications protocols for wireless communication. The computer system 400 can further include a telecommunications adaptor 440 for coupling to one or more network(s) 435.

The network(s) 435 may be substantially similar to or identical to the network(s) 325 (depicted in FIG. 3). The network(s) 435 may be and or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples, can be an IP-based network for communication between the network(s) 435 and any external device. The computer system 400 may transmit and receive data between the network(s) 435 and devices and/or systems external to the computer system 400. The network(s) 435 can also be and/or include a packet-switched network such as a local area network, wide area network, metropolitan area network, the Internet, or other similar type of network environment.

Figure 5:
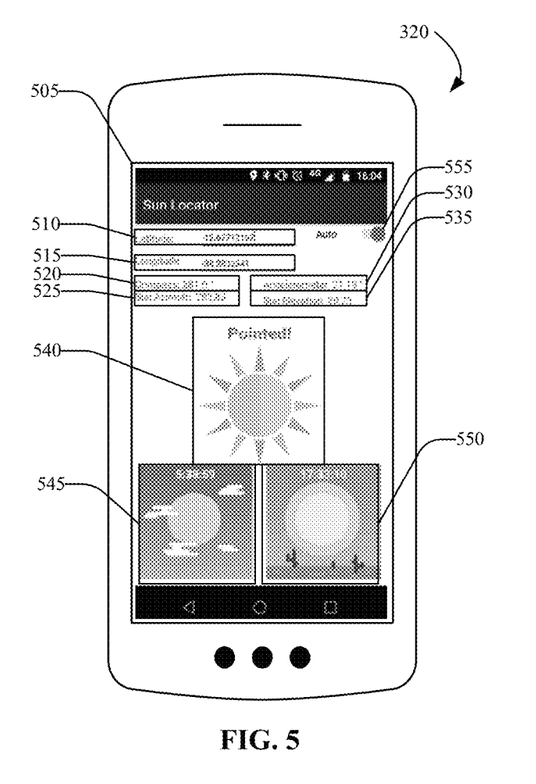
FIG. 5 illustrates a user interface of a sun location application operating on a mobile device according to embodiments described herein.

Turning now to FIG. 5, an example user interface 505 comprising information usable for determining sun washout information during a vehicle trip, and/or receiving warnings of upcoming visibility limitations associated with the sun washout. For example, the user interface 505 may include latitude information 510 and longitude information 515, which may be indicative of a latitude of the mobile device 320 (and/or the vehicle 105, 305), compass information 520 indicative of a compass direction of the vehicle 105, 305 and/or the mobile device 320, and sun azimuth information 525. The user interface 505 may also include vehicular slope angle information 530, and sun elevation information associated with the date and time, and location of the mobile device 320. In some aspects, the user interface 505 may include alert information 540 of one or more sun washout situations that may be imminent, sunset time 545 that may indicate time that the sun rises with respect to a particular vehicle position, and/or sunset information 550, which may indicate a time that the sun sets with respect to a particular vehicle position.

Figure 6:
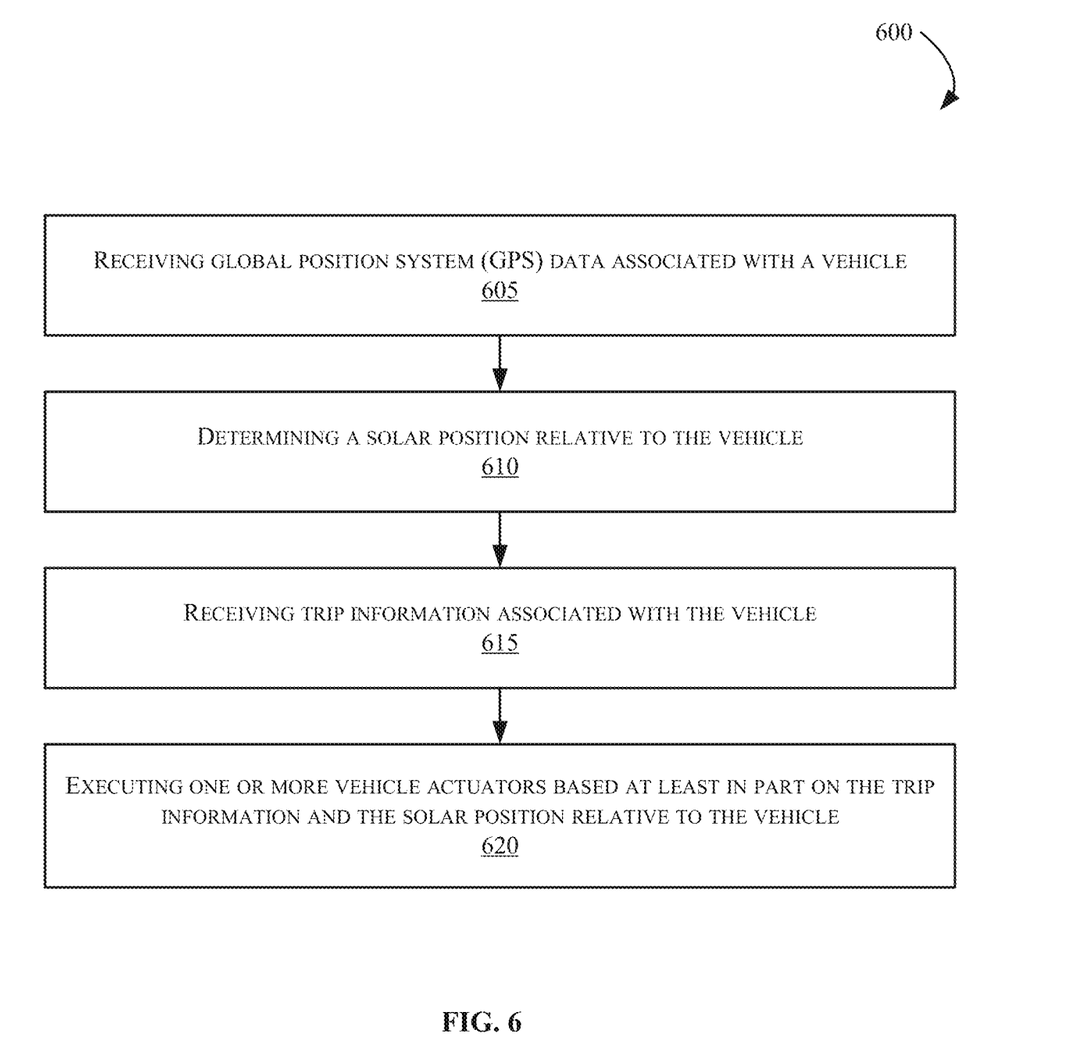
FIG. 6 depicts a flow diagram in accordance with the present disclosure.

FIG. 6 is a flowchart of an example method 600 of the present disclosure. The method 600 generally includes a step 605 of receiving global position system (GPS) data associated with the vehicle 105, 305.

A step 610 may include determining a solar position relative to the vehicle 105, 305. This step may include determining a potential sun glare period during a future time period based at least in part on the trip information associated with the vehicle 105, 305. In other aspects, determining the solar position relative to the vehicle can include relaying the sun glare period information 145 to an output device onboard the vehicle 105, 305. The output device may display a warning indicative of the sun glare period. The warning may be based on a predicted location of the vehicle 105, 305 at a future period of time. In such cases, displaying the warning indicative of the sun glare period can include determining a present location of the vehicle 105, determining a vehicle speed, determining a vehicle direction, and displaying the warning via the output device at a predetermined period of time before the vehicle reaches the predicted location based at least in part on the present location of the vehicle and the vehicle speed. A predetermined time period may be, for example, 10 seconds, 1 minute, 5 minutes, etc. A step 615 may include receiving trip information associated with the vehicle 105, 305. A step 620 may include executing one or more vehicle actuators based at least in part on the trip information and the solar position relative to the vehicle. This step can include selecting a vehicle window based at least in part on the solar position and the trip information, and generating a window tint command that causes the window to tint based at least in part on the selected vehicle window.

In other aspects, executing the one or more vehicle actuators may include selecting an air vent actuator based at least in part on the solar position and the trip information, and generating a vent control command that causes the vent to change one or more of an airflow temperature, and an airflow velocity.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A computer-implemented method, comprising:
receiving global position system (GPS) data associated with a vehicle;
determining a solar position relative to the vehicle;
receiving trip information associated with the vehicle; and
executing a vehicle actuator based at least in part on the GPS data, the trip information, and the solar position relative to the vehicle,
wherein determining the solar position relative to the vehicle comprises determining a sun glare period during a future time period based at least in part on the trip information associated with the vehicle.

2. The computer-implemented method according to claim 1, further comprising: relaying the sun glare period to an output device onboard the vehicle; and
displaying, using the output device, a warning indicative of the sun glare period.

3. The computer-implemented method according to claim 2, wherein the warning is based on a predicted location of the vehicle at the future period of time, wherein displaying the warning indicative of the sun glare period comprises:
determining a present location of the vehicle;
determining a vehicle speed;
determining a vehicle direction; and
displaying the warning via the output device at a predetermined period of time before the vehicle reaches the predicted location of the vehicle based at least in part on the present location of the vehicle and the vehicle speed.

4. The computer-implemented method according to claim 1, wherein executing the vehicle actuator based at least on the trip information and the solar position relative to the vehicle comprises:
selecting a vehicle window based at least in part on the GPS data, the solar position, and the trip information.

5. The computer-implemented method according to claim 4, further comprising generating a window tint command that causes the window to tint based at least in part on the selected vehicle window.

6. The computer-implemented method according to claim 1, wherein executing the vehicle actuator comprises:
selecting an air vent actuator based at least in part on the GPS data, the solar position, and the trip information.

7. The computer-implemented method according to claim 6, further comprising:
generating a vent control command that causes the vent to change an airflow temperature and/or an airflow velocity.

8. A system, comprising:
a processor; and
a memory for storing executable instructions, the processor configured to execute the instructions to:
receive global position system (GPS) data associated with a vehicle;
determine a solar position relative to the vehicle;
receive trip information associated with the vehicle;
execute one or more vehicle actuators based at least on the GPS data, the trip information, and the solar position relative to the vehicle; and
determine a sun glare period during a future time period based at least in part on the trip information associated with the vehicle.

9. The system according to claim 8, wherein the processor is further configured to:
relay the sun glare period to an output device onboard the vehicle; and
display, using the output device, a warning indicative of the sun glare period.

10. The system according to claim 9, wherein the warning is based on a predicted location of the vehicle at the future period of time, wherein displaying the warning indicative of the sun glare period comprises:
determining a present location of the vehicle;
determining a vehicle speed;
determining a vehicle direction; and
displaying the warning via the output device at a predetermined period of time before the vehicle reaches the predicted location of the vehicle based at least in part on the present location of the vehicle and the vehicle speed.

11. The system according to claim 8, wherein the processor is configured to execute the one or more vehicle actuators based at least in part on the GPS data, the trip information and the solar position relative to the vehicle by generating a window tint command that causes the window to tint.

12. The system according to claim 11, wherein the processor is further configured to select a vehicle window based at least in part on the solar position and the trip information.

13. The system according to claim 8, wherein the processor is configured to execute the one or more vehicle actuators by selecting an air vent actuator based at least in part on the GPS data, the solar position and the trip information.

14. The system according to claim 13, wherein the processor is further configured to generate a vent control command that causes the vent to change one or more of an airflow temperature, and an airflow velocity.

15. A non-transitory computer-readable storage medium comprising instructions that, when executed by one or more processors, cause the processors to perform acts comprising:
   receiving global position system (GPS) data associated with a vehicle;
   determining a solar position relative to the vehicle;
   receiving trip information associated with the vehicle;
   executing one or more vehicle actuators based at least on the GPS data, the trip information and the solar position relative to the vehicle; and
   determining a sun glare period during a future time period based at least in part on the trip information associated with the vehicle.

16. The non-transitory computer-readable storage medium according to claim 15, further comprising:
   relaying the sun glare period to an output device onboard the vehicle; and
   displaying, using the output device, a warning indicative of the sun glare period.

17. The non-transitory computer-readable storage medium according to claim 16, wherein the warning is based on a predicted location of the vehicle at a future period of time, wherein displaying the warning indicative of the sun glare period comprises:
   determining a present location of the vehicle;
   determining a vehicle speed;
   determining a vehicle direction; and
   displaying the warning via the output device at a predetermined period of time before the vehicle reaches the predicted location of the vehicle based at least in part on the present location of the vehicle and the vehicle speed.

18. A computer-implemented method, comprising:
   receiving global position system (GPS) data associated with a vehicle;
   determining a solar position relative to the vehicle;
   receiving trip information associated with the vehicle; and
   executing a vehicle actuator based at least in part on the GPS data, the trip information, and the solar position relative to the vehicle, wherein executing the vehicle actuator based at least on the trip information and the solar position relative to the vehicle comprises:
      selecting a vehicle window based at least in part on the GPS data, the solar position, and the trip information.

19. The computer-implemented method according to claim 18, further comprising generating a window tint command that causes the window to tint based at least in part on the selected vehicle window.

* * * * *